United States Patent
Louis

(10) Patent No.: US 6,449,855 B1
(45) Date of Patent: Sep. 17, 2002

(54) LASER ALIGNING AND MEASURING DEVICE

(76) Inventor: Daniel P. Louis, 657 Barber La., Joliet, IL (US) 60435

(*) Notice: Subject to any disclaimer, the term of this patent is extended or adjusted under 35 U.S.C. 154(b) by 27 days.

(21) Appl. No.: 09/580,418

(22) Filed: May 30, 2000

(51) Int. Cl.[7] .............................................. B43L 13/00
(52) U.S. Cl. ............................ 33/286; 33/276; 33/474; 33/DIG. 21
(58) Field of Search .......................... 33/286, 227, 228, 33/276, 277, 451, 474, 481, DIG. 21, 482

(56) References Cited

U.S. PATENT DOCUMENTS

| | | | |
|---|---|---|---|
| 343,616 A | * 6/1886 | Upson et al. ................. | 33/474 |
| 5,519,942 A | 5/1996 | Webb .......................... | 33/290 |
| 5,531,031 A | 7/1996 | Green ......................... | 33/365 |
| 5,561,911 A | 10/1996 | Martin ........................ | 33/365 |
| 5,604,987 A | * 2/1997 | Cupp .......................... | 33/275 R |
| 5,673,492 A | * 10/1997 | Williams ...................... | 33/286 |
| 5,713,135 A | 2/1998 | Acopulos ..................... | 33/451 |
| 5,894,675 A | 4/1999 | Cericola ...................... | 33/451 |
| 6,195,902 B1 | * 3/2001 | Jan et al. ...................... | 33/451 |
| 6,230,416 B1 | * 5/2001 | Trigilio ....................... | 33/451 |
| 6,279,239 B1 | * 8/2001 | Astudillo ..................... | 33/276 |

* cited by examiner

Primary Examiner—Christopher W. Fulton
(74) Attorney, Agent, or Firm—Evan D. Roberts

(57) ABSTRACT

An aligning and measuring device having a framing square with inner and outer converging edges connected by opposing upper and lower surfaces having a certain dimension. One or more laser beam generators providing one or more laser beams along a line in a plane transverse to the opposing surfaces and through one or more of said edges for aligning said edges directly relative to a surface engaged by the device hereof.

5 Claims, 3 Drawing Sheets

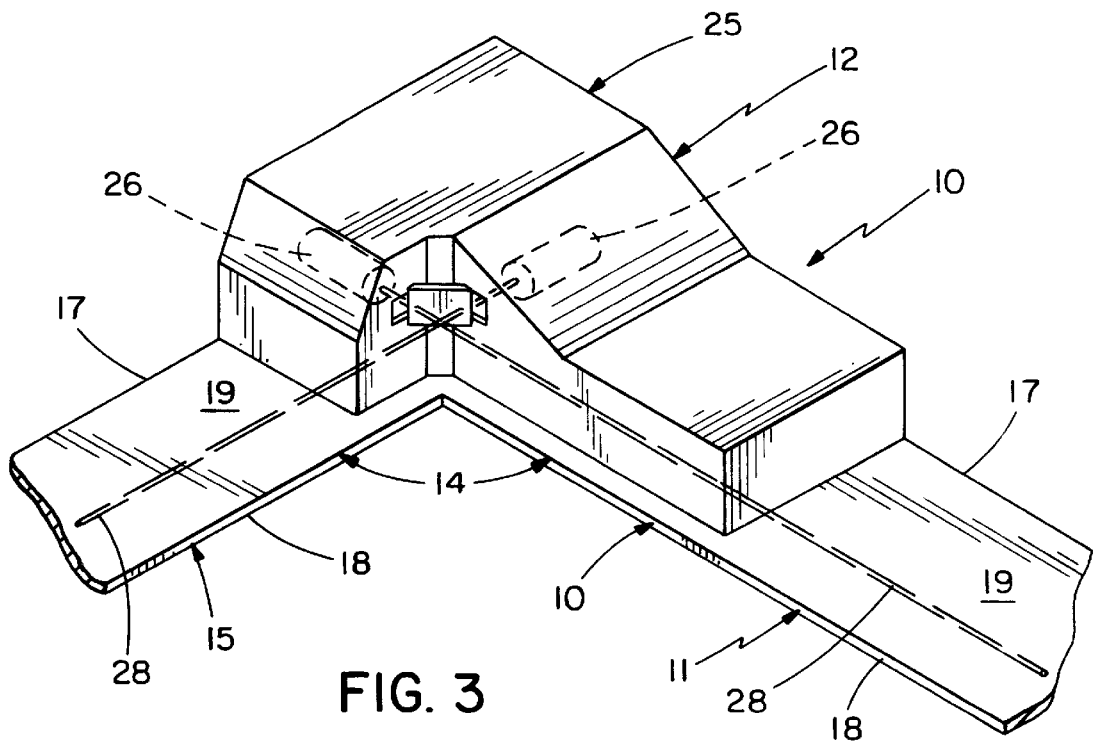
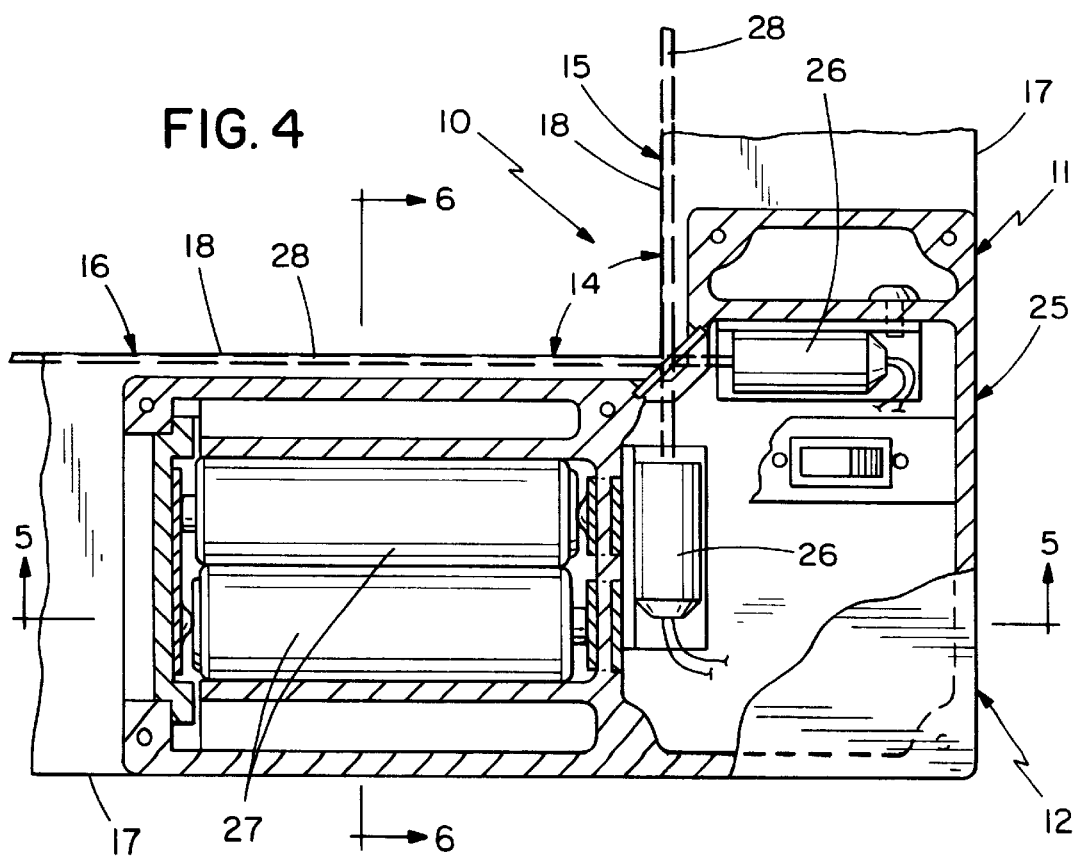

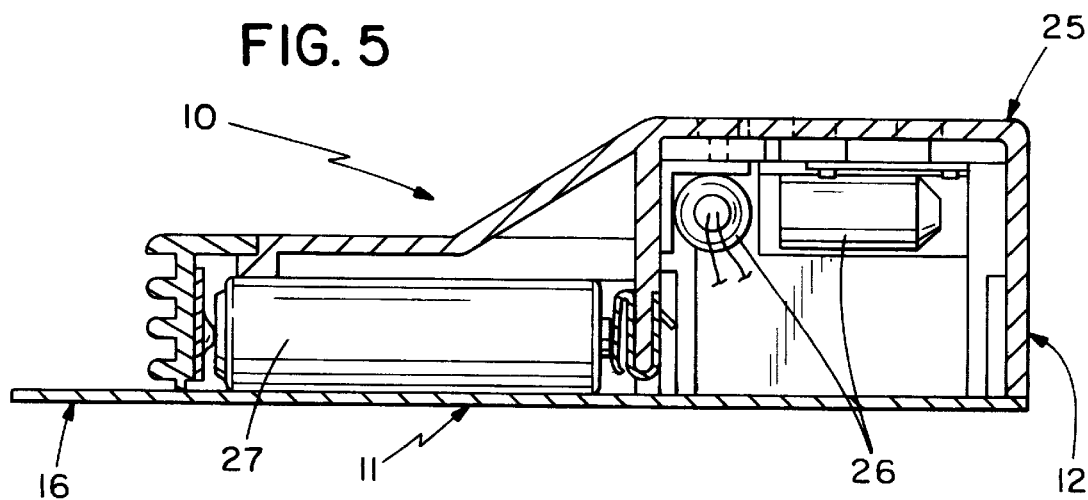
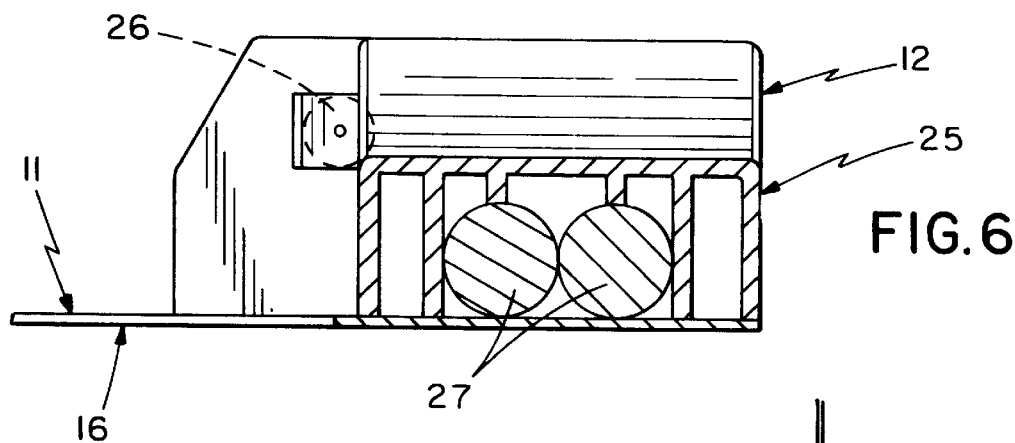
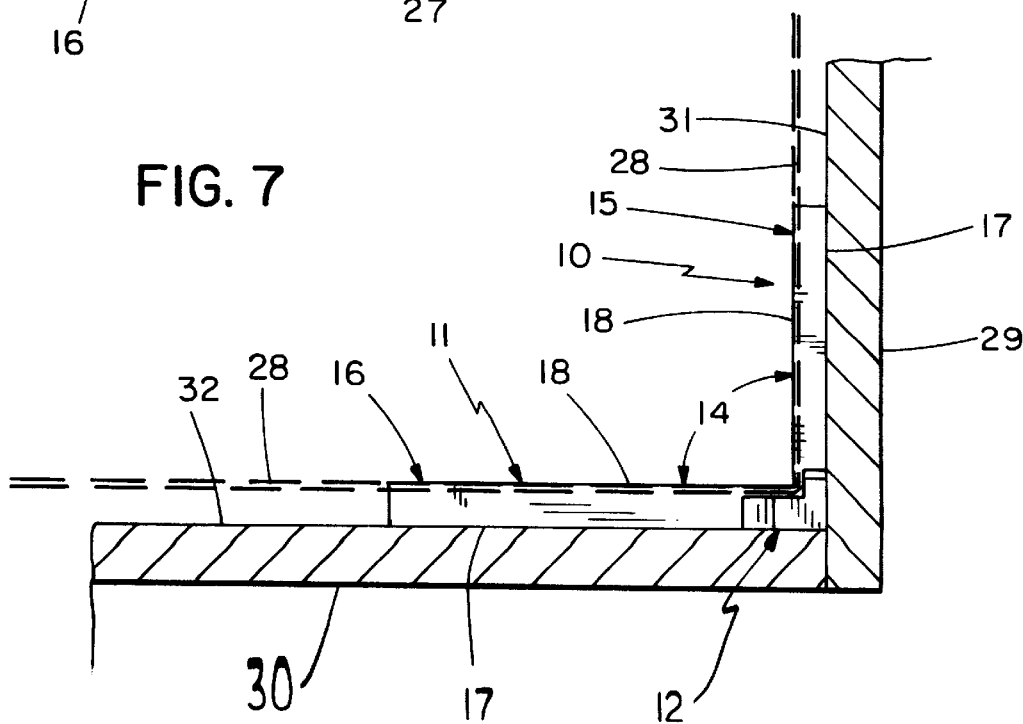

LASER ALIGNING AND MEASURING DEVICE

BACKGROUND OF THE INVENTION

Previous known laser aligning and measuring devices have provided various combinations of a ruler or framing square with a laser beam to measure and align structures relative to the device. However, all such known devices direct the laser beam on a line substantially parallel to a structure to be measured and aligned but at a distance from the structure, requiring an extrapolation by rough estimate or a secondary measuring device to relate the laser beam to the structure being measured and aligned due to the distance between the laser beam and the structure.

SUMMARY OF THE INVENTION

It is therefore an object of this invention to provide an aligning and measuring device that can apply a laser beam directly along a plane through the edge of a measuring element and immediately adjacent a structure to be aligned and/or measured thereby.

A further object of this invention is to provide an aligning and measuring device that will apply a laser beam in a plane perpendicular to the surface of a multi-leg framing tool along the inner edge surface of each leg of the framing tool whereby the laser beam will pass directly along one or both surfaces of a structure having intersecting surfaces, when the framing tool is applied thereto at the intersection.

An additional object of this invention is to provide an aligning and measuring device that will apply a laser beam in a plane perpendicular to the surface of a square framing tool along the inner edge surface of each leg of the square framing tool whereby the laser beam will pass directly along one or both outer surfaces of a structure having surfaces intersecting at 90°, when the framing square is applied thereto.

Another object of this invention is to provide an aligning and measuring device that will apply a laser beam in a plane perpendicular to the surface of a multi-leg framing tool along the outer edge surface of each leg of the square framing tool whereby the laser beam will pass generally parallel to one or both outer surfaces of a structure having surfaces intersecting at 90°, at a certain distance therefrom, when the framing tool is applied thereto.

A further object of this invention is to provide an aligning and measuring device having two laser sources that will apply a respective laser beam in a plane perpendicular to the surface of a multi-leg framing tool along the inner and outer edge surface of each leg of the square framing tool whereby each laser beam source is adjustable on said frame to calibrate the angle between said beams.

Other objects, advantages and novel aspects of the invention will become apparent upon consideration of the following detailed description in conjunction with the accompanying drawings wherein.

FIG. 3 is a perspective view of the aligning and measuring device of this invention showing diverging laser beams thereof respectively in planes transverse to leg members of a multi-leg framing tool and respectively through planes transverse to the inner edge surfaces thereof FIG. 4 is a partially sectional top cutaway view of the aligning and measuring device hereof showing the basic elements of the laser producing apparatus with the laser beams shown in planes respectively transverse to leg members of a framing square.

FIG. 5 is a vertical sectional view along line 5—5 of FIG. 4 of the aligning and measuring device hereof showing the basic elements of laser producing elements with the laser beams thereof in planes respectively transverse to the leg members of a framing square.

FIG. 6 is a vertical sectional view along line 6—6 of FIG. 4 of the aligning and measuring device hereof showing the basic elements of the laser producing elements with the laser beams in planes respectively transverse to the leg members of a framing square.

FIG. 7 is a horizontal sectional view of the aligning and measuring device of this invention positioned on the inside surfaces of a square wall structure showing the laser beam a certain distance from and along inner surfaces of the structure to measuring and aligning the inner surfaces thereof.

The aligning and measuring device of this invention is generally represented by the numeral 10 and includes generally, a multi-leg framing tool 11 and laser beam source 12.

Figure 1:
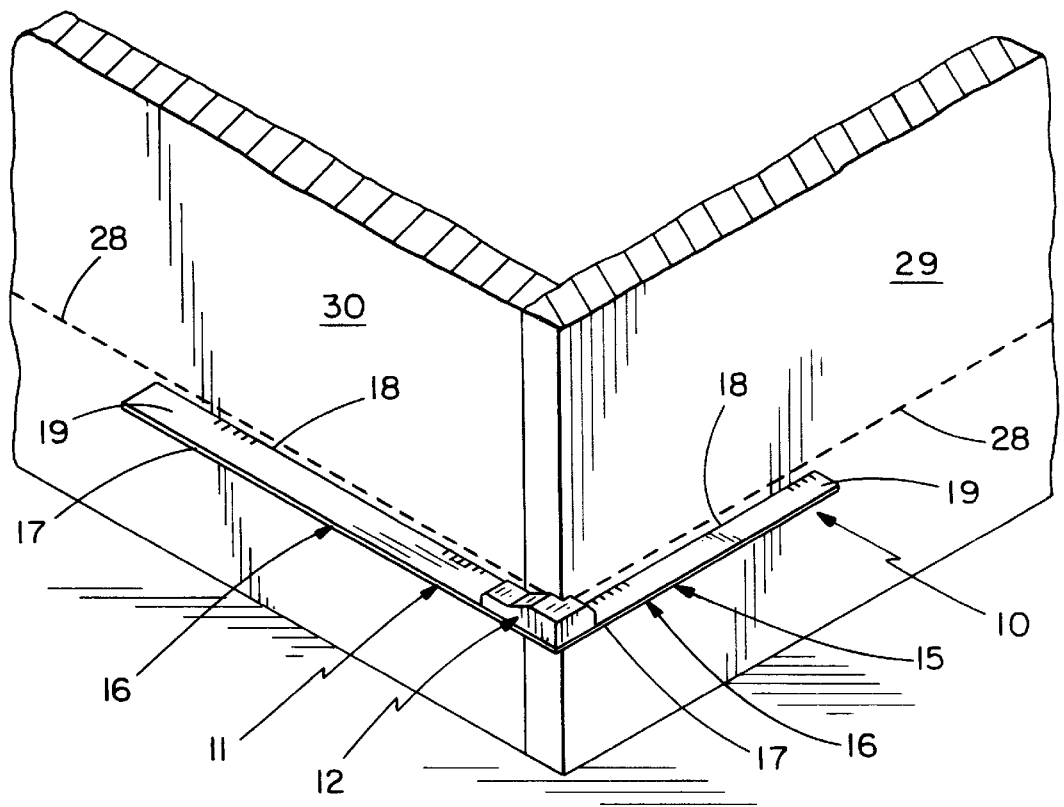
FIG. 1 is a perspective view of the aligning and measuring device of this invention positioned on the outside surfaces of a multi-surface wall structure showing the laser beam having a slightly exaggerated thickness for illustrative purposes and projected directly along the outer surfaces of the structure to be measured and aligned.
Figure 2:
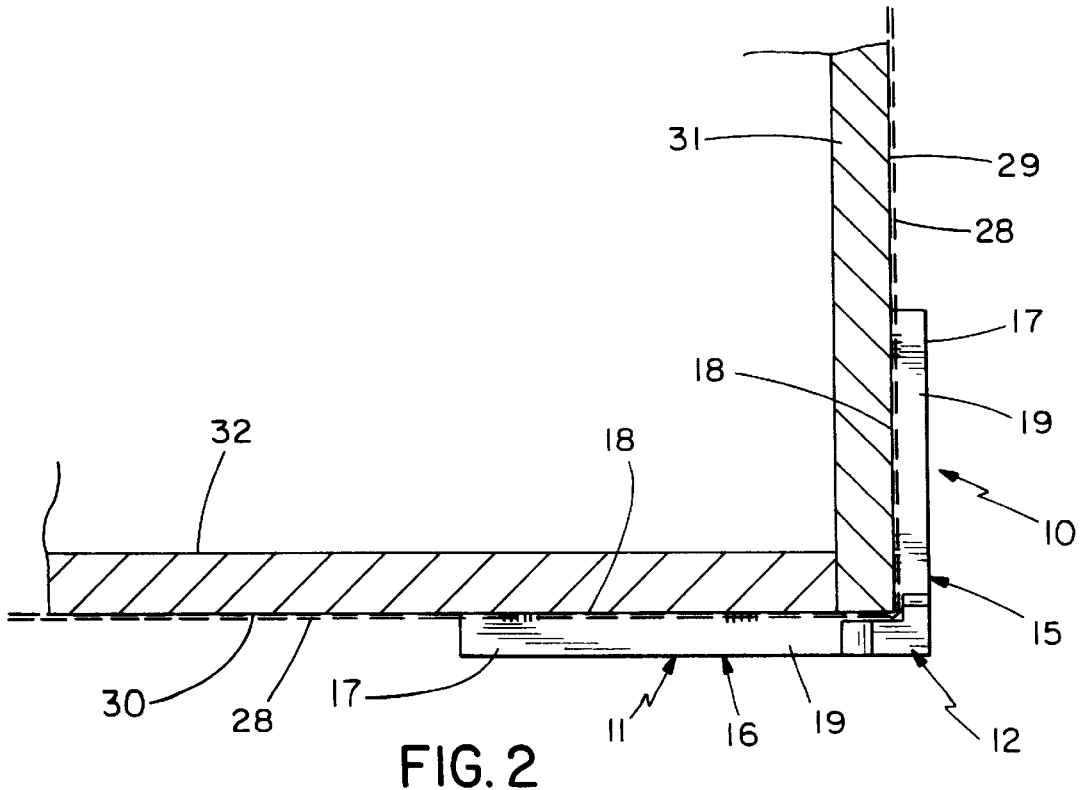
FIG. 2 is a top view of the aligning and measuring device of this invention positioned on the outside intersecting surfaces of a wall structure showing the laser beam having a slightly exaggerated thickness for illustrative purposes and directly along the outer surfaces of the structure to be measured and aligned.

Framing tool 11 has two basic leg members 15 and 16 joined at an angle 14 (FIGS. 3 and 4) such as 90° as shown in FIGS. 1–4 and 7. The degree of the angle could be varied some for applications of a lesser or greater degree if desired for special use. Leg members 15 and 16 have outer and an inner parallel surface edges 17 and 18 intersecting at angle 14. Also, legs 15 and 16 have common top and bottom longitudinal surfaces 19 and 20 interconnecting edge surfaces 17 and 18. Each leg member 15 and 16 has a certain predetermined lateral width.

Laser beam source 12 has a containment body 25 (FIGS. 3–6) housing two laser beam generators 26 powered by an electric source such as batteries 27. Laser beam generators 26 are respectively positioned adjacent the vertex of leg members 15 and 16 to respectively project divergent laser beams 28 in respective planes transverse to respective edge surfacer 8 of leg members 15 and 16. It should be noted that generators 26 are each adjustably secured to leg members 15 and 16 to allow angle calibration between beams 26. Also, it is to be noted that laser beams 28 (FIGS. 1–4 and 7) are shown in slightly exaggerated thickness for illustrative purposes. This provides a laser beam 28 directly along a wall or other surface 29 or 30 to which either inner edge surface 18 can be placed in engagement with.

In use (FIGS. 1 and 2), where there may be only one surface to be aligned and/or measured, a laser beam generator 26 is activated to project a laser beam 28 in a plane through edge surface 18 on leg 15. Device 10 is applied to the end of a surface 29 to be aligned and/or measured with inside edge surface 18 against surface 29. Laser beam 28 will be projected directly along, and coincident with surface 29, directly revealing irregularities in surface 29 to which it is applied.

Similarly, in use, where there are intersecting outside surfaces 29 and 30 (FIGS. 1 and 2) to be aligned and/or measured, laser generators 26 of laser source 12 are activated. Device 10 is applied to outer surfaces 29 and 30 at the intersection of surfaces 29 and 30 to be aligned and/or measured with inside edge surfaces 18 respectively 6 against surfaces 29 and 30. Laser beams 28 will be projected directly along, and coincident with, surfaces 29 and 30 revealing the irregularities of these surfaces.

In the event surfaces such as inner surfaces 31 and 32 are extremely irregular, alignment and measurement of such extreme irregularity can be detected by applying the outer edge surfaces 17 (FIG. 7) to intersecting surfaces 31 and 32 to be aligned and/or measured. Inasmuch as members 15 and 16 have a certain width, the irregularities of surfaces 29 and 30 can be measured relative to respective laser beams 28 at various locations along irregular surfaces 31 and 32.

It is to be understood that the invention is not to be limited to the specific constructions and arrangements shown and described, as it will be understood to those skilled in the art that certain changes may be made without departing from the principles of the invention.

What is claimed is:

1. An aligning and measuring device comprising a multi-leg framing tool having two elongated leg members joined at an angle, said members having outer and inner straight parallel surface edges respectively intersecting and respectively diverging from a vertex of said angle and adapted to directly engage a surface to be aligned, upper and lower parallel longitudinal surfaces on respective sides of said members laterally connecting said edges, a laser light beam source secured to said framing tool on one of said member surfaces adjacent the vertex of the angle of said edges, said beam source being positioned to provide a laser beam along a line in a plane transversely perpendicular to said longitudinal surfaces and through one of said edges and said laser beam is projected parallel to and adjacent to one of said edges for aligning said edge relative to a surface engaged by said edge of the device hereof.

2. An aligning and measuring device as claimed in claim 1 wherein said longitudinal surfaces have a certain lateral dimension between said outer and said inner intersecting straight edges.

3. An aligning and measuring device as claimed in claim 2 wherein said laser light beam source comprises two divergent laser light beams respectively along a line in respective planes wherein said planes are respectively transverse to said upper and lower surfaces and are respectively through said inner edges to provide divergent aligning by said edges directly in said planes of said inner edges and at said certain distance from said outer edges.

4. An aligning and measuring device as claimed in claim 1 wherein said laser light beam source comprises two divergent laser light beams respectively along a line in respective planes wherein said planes are transverse to said upper and lower surfaces and respectively through said diverging edges to provide divergent aligning by said edges.

5. An aligning and measuring device as claimed in claim 1 wherein said divergent angle is 90°.

* * * * *